United States Patent
Takagi

(10) Patent No.: US 10,872,233 B2
(45) Date of Patent: Dec. 22, 2020

(54) INFORMATION PROCESSING APPARATUS AND METHOD FOR CHANGING THE DIFFICULTY OF OPENING OR CLOSING AN INSTRUMENT ACCORDING TO FEELINGS OF A USER

(71) Applicant: SONY CORPORATION, Tokyo (JP)

(72) Inventor: Yoshinori Takagi, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 122 days.

(21) Appl. No.: 16/082,790

(22) PCT Filed: Jan. 30, 2017

(86) PCT No.: PCT/JP2017/003138
§ 371 (c)(1),
(2) Date: Sep. 6, 2018

(87) PCT Pub. No.: WO2017/187692
PCT Pub. Date: Feb. 11, 2017

(65) Prior Publication Data
US 2019/0087650 A1 Mar. 21, 2019

(30) Foreign Application Priority Data
Apr. 27, 2016 (JP) .................. 2016-089199

(51) Int. Cl.
*E06B 7/28* (2006.01)
*G06F 3/01* (2006.01)
(Continued)

(52) U.S. Cl.
CPC ............ *G06K 9/00335* (2013.01); *E06B 7/28* (2013.01); *G06F 3/01* (2013.01); *G06F 3/011* (2013.01);
(Continued)

(58) Field of Classification Search
None
See application file for complete search history.

(56) References Cited

U.S. PATENT DOCUMENTS

2014/0111690 A1  4/2014  Kim et al.
2019/0332680 A1*  10/2019  Wang .................. G10L 15/1815

FOREIGN PATENT DOCUMENTS

JP    2000-207583 A    7/2000
JP    2005-235090 A    9/2005
(Continued)

OTHER PUBLICATIONS

International Search Report dated Mar. 28, 2017, in PCT/JP2017/003138, filed Jan. 30, 2017.
(Continued)

*Primary Examiner* — Idowu O Osifade
(74) *Attorney, Agent, or Firm* — Oblon, McClelland, Maier & Neustadt, L.L.P.

(57) ABSTRACT

[Object] To provide an information processing apparatus, an information processing method, and a program that make it possible to intuitively convey a feeling of a person located indoors to a person located outdoors.
[Solution] An information processing apparatus including: an acquisition unit that acquires a feeling of a user located indoors; and a control unit that controls an opening-closing resistance of an openable and closable instrument, according to the feeling of the user.

15 Claims, 5 Drawing Sheets

(51) Int. Cl.
*G10L 15/18* (2013.01)
*G06K 9/00* (2006.01)
*E05F 15/73* (2015.01)
*G10L 25/63* (2013.01)

(52) U.S. Cl.
CPC ......... *G06F 3/016* (2013.01); *G06K 9/00221* (2013.01); *G10L 15/1807* (2013.01); *E05F 15/73* (2015.01); *E05F 2015/767* (2015.01); *E05Y 2400/852* (2013.01); *E05Y 2900/132* (2013.01); *G06F 2203/011* (2013.01); *G06K 9/00302* (2013.01); *G10L 25/63* (2013.01)

(56) References Cited

FOREIGN PATENT DOCUMENTS

| | | |
|---|---|---|
| JP | 2006-200176 A | 8/2006 |
| JP | 2008-27086 A | 2/2008 |
| JP | 2014-87064 A | 5/2014 |

OTHER PUBLICATIONS

Hattori, M. et al. "KY-System : textile-based physical interface to assist to read the gap between a user and an atmosphere in semi-public space", IEICE Technical Report, vol. 114, No. 487, Feb. 24, 2015, pp. 193-198, with English translation (29 total pages).

\* cited by examiner

FIG. 7
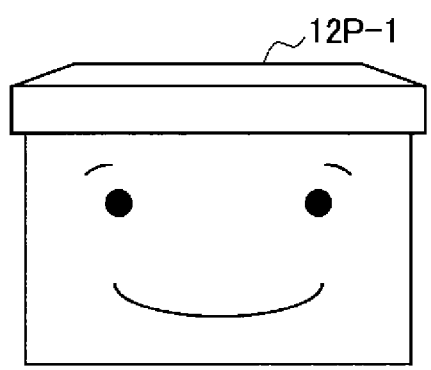
SIGN OF SMILE
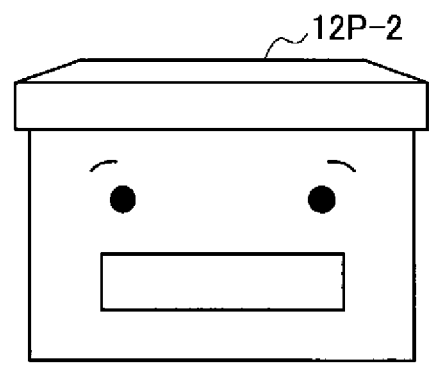
NORMAL SIGN
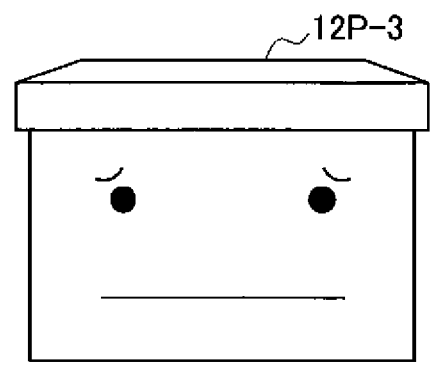
SIGN OF REJECTION

INFORMATION PROCESSING APPARATUS AND METHOD FOR CHANGING THE DIFFICULTY OF OPENING OR CLOSING AN INSTRUMENT ACCORDING TO FEELINGS OF A USER

TECHNICAL FIELD

The present disclosure relates to an information processing apparatus, an information processing method, and a program.

BACKGROUND ART

Communication through "language" (verbal communication) is used most often as existing communication. The communication through language is superior in information transmission. For example, conveying feelings to residents or a family located indoors is possible by way of the communication through language.

Further, openable and closable fixtures such as doors or windows are installed between the indoors and the outdoors. Regarding such fixtures, Patent Literature 1 below describes, for example, an electric door closer that makes it possible to open a door only with a little force, without the need of human power for compressing a spring.

CITATION LIST

Patent Literature

Patent Literature 1: JP 2006-200176A

DISCLOSURE OF INVENTION

Technical Problem

Here, it is possible for residents located indoors to convey their feelings to each other by way of the communication through language; however, it has been difficult for a person located outdoors to intuitively recognize a feeling of a person located indoors where the indoors are separated from the outdoors by a door, and the like. Therefore, there have been often the cases in which a contact from a person located outdoors gives stress to a person located indoors, depending on the state of the feeling of the person located indoors.

In view of the above, there is proposed an information processing apparatus, an information processing method, and a program that make it possible to intuitively convey a feeling of a person located indoors to a person located outdoors, in the present disclosure.

Solution to Problem

According to the present disclosure, there is proposed an information processing apparatus including: an acquisition unit that acquires a feeling of a user located indoors; and a control unit that controls an opening-closing resistance of an openable and closable instrument, according to the feeling of the user.

According to the present disclosure, there is proposed an information processing method performed by a processor, the method including: acquiring a feeling of a user located indoors; and controlling an opening-closing resistance of an openable and closable instrument according to the feeling of the user.

According to the present disclosure, there is proposed a program that causes a computer to function as: an acquisition unit that acquires a feeling of a user located indoors; and a control unit that controls an opening-closing resistance of an openable and closable instrument according to the feeling of the user.

Advantageous Effects of Invention

As described above, according to the present disclosure, it is possible to intuitively convey the feeling of the person located indoors to the person located outdoors.

Note that the effects described above are not necessarily limitative. With or in the place of the above effects, there may be achieved any one of the effects described in this specification or other effects that may be grasped from this specification.

BRIEF DESCRIPTION OF DRAWINGS

FIG. 7 is a diagram illustrating an example of sign expressions of a mailbox according to the second embodiment.

MODE(S) FOR CARRYING OUT THE INVENTION

Figure 1:
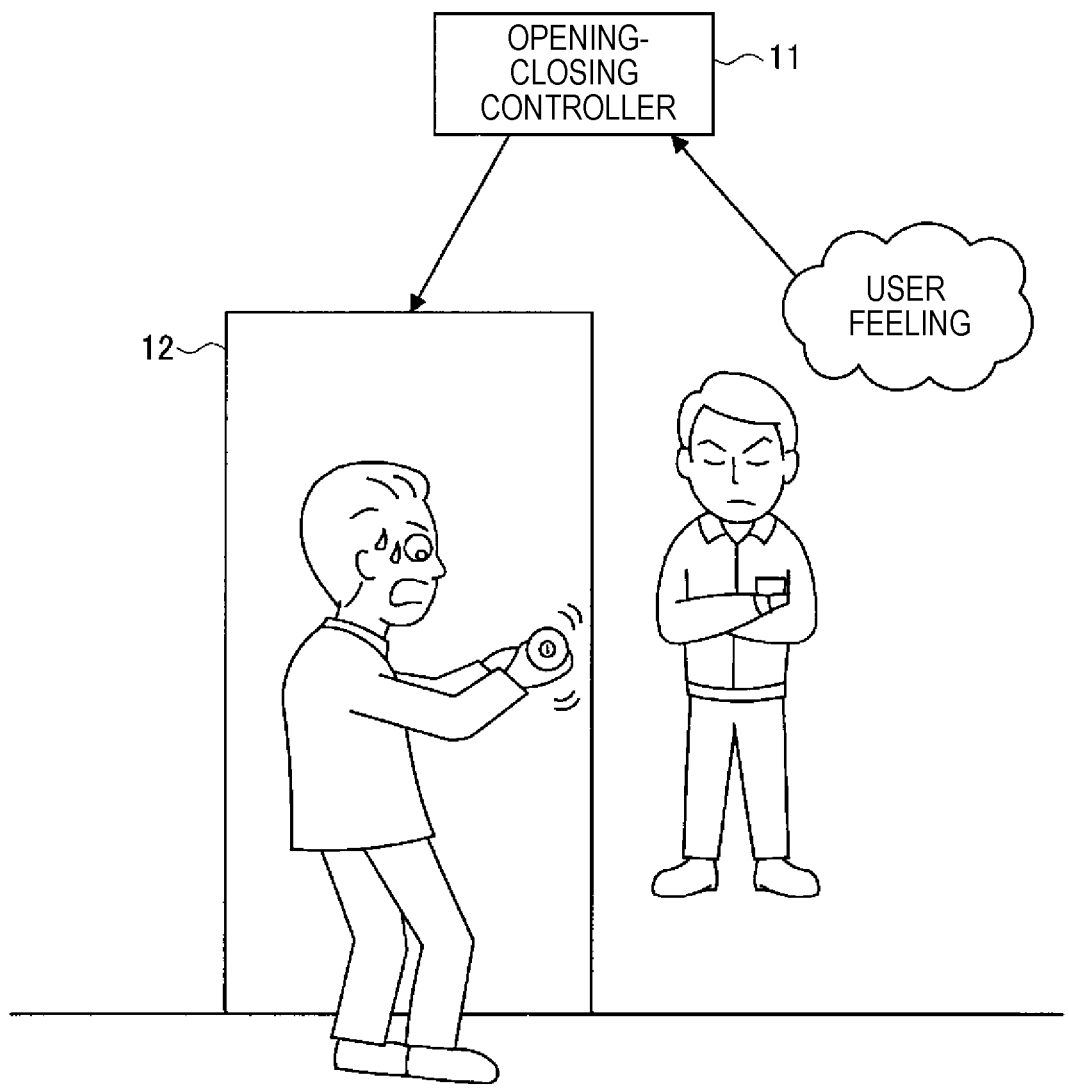
FIG. 1 is an illustration describing an outline of an information processing apparatus according to the present embodiment.

Hereinafter, (a) preferred embodiment(s) of the present disclosure will be described in detail with reference to the appended drawings. Note that, in this specification and the appended drawings, structural elements that have substantially the same function and structure are denoted with the same reference numerals, and repeated explanation of these structural elements is omitted.

Further, description is given in the order below.
1. Outline of information processing system according to an embodiment of the present disclosure
2. Embodiments
2-1. First embodiment
2-2. Second embodiment
3. Conclusion

1. OUTLINE OF INFORMATION PROCESSING SYSTEM ACCORDING TO AN EMBODIMENT OF THE PRESENT DISCLOSURE

First, description is given of an outline of an information processing system according to an embodiment of the present disclosure. FIG. 1 is an illustration describing an outline of an information processing apparatus according to the present embodiment. As illustrated in FIG. 1, the information processing system according to the present embodiment detects a user feeling of a person located indoors. Thereafter, according to the detected user feeling, an opening-closing controller 11 controls an opening-closing resistance of an opening-closing apparatus 12. This makes it possible to intuitively convey the feeling of the person located indoors to a person located outdoors (specifically, a person who is trying to open a door).

The opening-closing apparatus 12 is an example of an openable and closable instrument. For example, an entrance door is assumed.

As described above, it is difficult for the person located outdoors to understand the (current) feeling of the person located indoors. Therefore, there have been often the cases in which a contact from the person located outdoors gives stress to the person located indoors, depending on the state of the feeling of the person located indoors.

To address this, the information processing system according to the present embodiment controls the opening-closing resistance according to the user feeling of the person located indoors, to thereby make it possible to intuitively convey the user feeling to the person located outdoors. Specifically, the opening-closing resistance is made heavy in a case where the user feeling is not in a good mode, which makes it difficult for the person located outdoors to open the door. This makes it possible to intuitively recognize that the feeling of the person located indoors is not in a good on the basis of the difficulty (heaviness) in opening the door. It is to be noted that the calculation of the heaviness of the opening-closing resistance is possible by way of quantifying the user feeling.

The outline of the information processing system according to the present embodiment is described as above. Next, description is given of embodiments of the information processing system according to the present embodiment, with reference to the drawings.

2. EMBODIMENTS

2-1. First Embodiment (Configuration)

Figure 2:
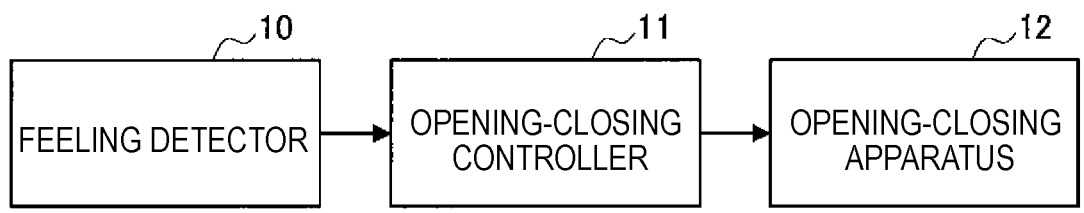
FIG. 2 is a block diagram illustrating a configuration example of an information processing system according to a first embodiment.

FIG. 2 is a block diagram illustrating a configuration example of an information processing system 1 according to a first embodiment. As illustrated in FIG. 2, the information processing system 1 includes a feeling detector 10, an opening-closing controller 11, and an opening-closing apparatus 12.

The feeling detector 10 has a function of detecting a feeling of a user located indoors. For example, the feeling detector 10 may recognize a facial image of the user on the basis of a captured image captured by a camera installed indoors, and quantify the user feeling on the basis of the facial image (for example, a degree of a smile). Further, it is also possible for the feeling detector 10 to recognize conversation contents, a voice tone, etc. of a user on the basis of the user's voice collected by a microphone, to thereby quantify the user feeling. Furthermore, it is also possible for the feeling detector 10 to recognize the user's bio-information (pulse, heartbeat, perspiration amount, brain wave, body temperature, etc.) detected by a biosensor, to thereby quantify the user feeling. As described in, for example, JP 2005-64839A, as a specific example of an analysis of a state of a feeling by using bio-information, a feeling parameter value may be calculated on the basis of a plurality of kinds of digitalized pieces of bio-information by using a learned feeling model or a re-learned feeling model for individual users. Further, as described in JP 2007-41988A, in order to recognize the user feeling with higher precision, the user feeling may be estimated by extracting a characteristic amount on the basis of information such as a facial expression, a gesture, a voice of the user. Furthermore, the user feeling may be estimated on the basis of meta-information of the contents which the user is viewing, and the user feeling may be recognized on the basis of both of these estimated results.

The opening-closing controller 11 controls the opening-closing resistance of the opening-closing apparatus 12 according to the user feeling detected by the feeling detector 10. The opening-closing controller 11 according to the present embodiment functions as an operation processing unit and a control unit, and controls the entire operation in the information processing system 1 according to various kinds of programs. The opening-closing controller 11 is achieved by an electric circuit such as a CPU (Central Processing Unit) or a microprocessor. Further, the opening-closing controller 11 may include ROM (Read Only Memory) that stores programs to be used, operation parameters, etc., and RAM (Random Access Memory) that temporarily stores parameters that change appropriately, etc. In addition, the opening-closing controller 11 may be achieved by an information processing apparatus such as a home agent that is coupled to a home network, and may be separated from the feeling detector 10 or the opening-closing apparatus 12.

More specifically, the opening-closing controller 11 increases and decreases the opening-closing resistance of the opening-closing apparatus 12 according to the user feeling, to thereby intuitively convey the user feeling. For example, in a case where the opening-closing apparatus 12 is an automatic door, since the automatic door normally opens and closes automatically, the opening-closing resistance is "0". On the other hand, without any assistance from electricity at the time of blackout, etc. when opening or closing the door, it is necessary to open the door while considerable resistance being applied. Therefore, in a case where the opening-closing apparatus 12 is an automatic door, and the user feeling is in a good mood (the feeling of accepting entrance from outside), the opening-closing controller 11 may control the power supply of the automatic door to turn ON. On the other hand, in a case where the opening-closing apparatus 12 is an automatic door, and the use feeling is no in a good mood (the feeling of rejecting entrance from outside), the opening-closing controller 11 may control the power supply of the automatic door to turn OFF.

Further, it is also possible for the opening-closing controller 11 to cause an assistance speed to change according to the user feeling. This serves as an intermediate control between ON and OFF of the power supply of the automatic door. Therefore, it is possible, for example, to cause the opening or closing to be slower as the feeling of rejecting the entrance from outside is stronger, or cause the door to be heavier when manually opening the door.

Further, even in a case where the opening-closing apparatus 12 is not an automatic door, control of substantially increasing and decreasing the opening-closing resistance is still possible, for example, by making rolling resistance variable. For example, in a case where the opening-closing apparatus 12 is a slide door, a method is considered in which the opening-closing resistance is achieved by changing the irregularity on a lane on which pulleys provided at a door bottom part go round, or in which control of increasing and decreasing the opening-closing resistance by magnetic resistance is performed by providing an electric magnet to the door.

In addition, as described in JP 5799358B, there exists a load-type door opening-closing apparatus including an opening-closing mechanism that causes a door to be opened and closed by using a person's body weight without using electricity. Even in such an opening-closing apparatus, it is still possible to achieve the opening-closing resistance by changing the irregularity on the lane on which the pulleys provided at the door bottom part rotate, for example.

Further, in a case where the opening-closing apparatus 12 is a hinge-type door, a regulating valve is provided to a door closer thereof. What decides the speed at the time of closing by this regulating valve is a stress at the time of opening the door. Therefore, addition of a mechanism to regulate the regulating valve makes it possible to achieve the control of increasing and decreasing the opening-closing resistance according to the user feeling. It is to be noted that, as described in the above-described Patent Literature 1 (JP 2006-200176A), examples of the door closer include an electric door closer. In this case, similarly to the time of controlling the automatic door, it is possible to easily achieve the control of increasing and decreasing the opening-closing resistance according to the user feeling by changing the opening-closing speed or other parameters.

Further, even without the door closer, it is still possible for the opening-closing controller 11 to increase and decrease the resistance at the time of opening and closing the hinge-type door, by adding an electric magnet, etc. to the hinge part thereof.

The opening-closing apparatus 12 is an openable and closable instrument. The opening-closing apparatus 12 is, for example, an openable and closable fixture installed at the boundary with the outside, or a mail receiving apparatus having an openable and closable mail receiving opening (in the present specification, hereinafter, referred to as "mailbox"). As examples of the openable and closable fixture, an entrance door, a window, a door of a room in a building (partitioning a room between the inside and the outside), and the like are assumed. As further specific examples of the entrance door, the above-described automatic door, slide-type door, and hinge-type door, etc. are assumed. Furthermore, examples thereof may include a door of a refrigerator, a drawer of a wardrobe, and a door of a cabinet.

As described above, a window, a door in a building, and various kinds of doors each include an automatic, a slide-type, or a hinge-type opening-closing part, and the increase and decrease of the resistance at the time of opening and closing are similarly controlled. It is to be noted that, in a case where the degree of fog on a window glass is controllable between transparence and non-transparence, the information processing system 1 according to the present embodiment makes it possible to intuitively convey the user feeling by controlling the degree of fog according to the user feeling. For example, in a case where the user feeling is in a good mood (a feeling of accepting the entrance from outside), the information processing system 1 controls the window glass so as be transparent. On the other hand, in a case where the user feeling is not in a good mood (a feeling of rejecting the entrance from outside), the information processing system 1 controls the window glass so as to be non-transparent (obscured).

(Operation Processing)

Figure 3:
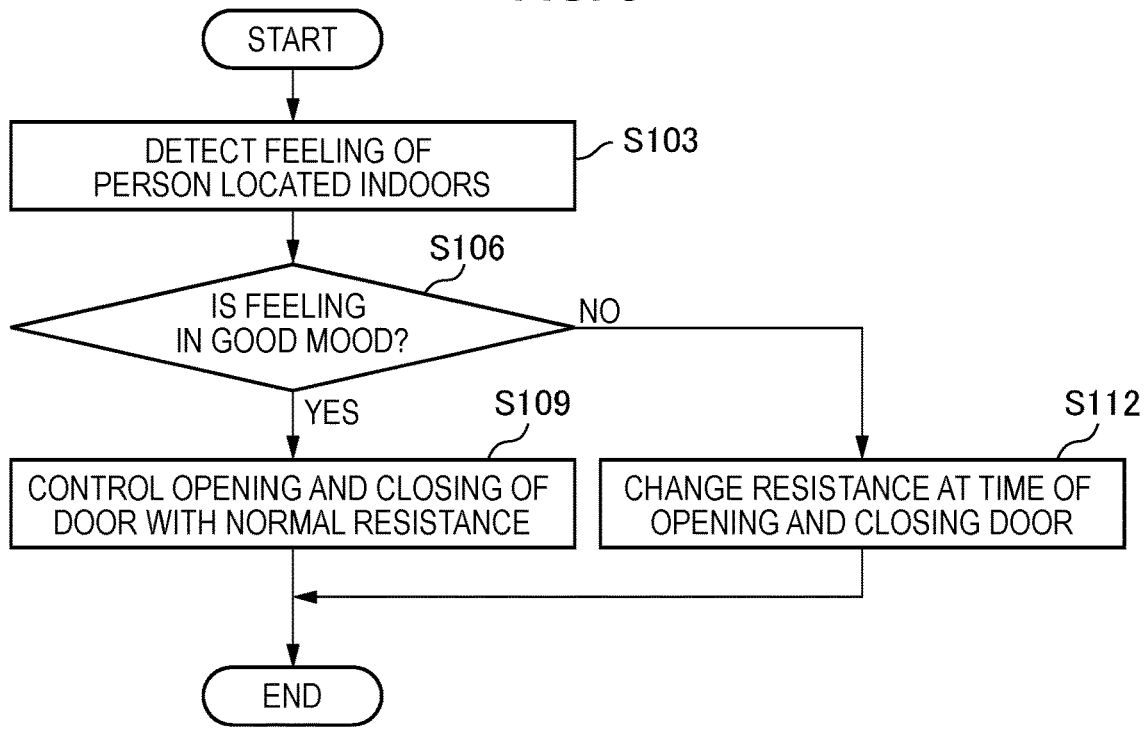
FIG. 3 is a flowchart illustrating operation processing according to the first embodiment.

Next, description is given of operation processing of the information processing system 1 according to the present embodiment with reference to the FIG. 3. FIG. 3 is a flowchart illustrating operation processing according to a first embodiment.

First, as illustrated in FIG. 3, the information processing system 1 according to the present embodiment detects a feeling of a user located indoors by the feeling detector 10 (Step S103).

Next, the opening-closing controller 11 determines whether the user feeling thus detected is in a good mood (Step S106).

Next, in a case where the user feeling is in a good mood (Step S106/Yes), the opening-closing controller 11 controls opening and closing a door (an example of the opening-closing apparatus 12) with a normal resistance (for example, resistance "0".

On the other hand, in a case where the user feeling is not in a good mood (Step S106/No), the opening-closing controller 11 changes the resistance of the door (an example of the opening-closing apparatus 12) at the time of opening and closing (Step S112). For example, the opening-closing controller 11 quantifies the degree of the user's bad mood or the feeling of rejecting the entrance from the outside, and thereby controls to cause the opening-closing resistance to be heavy according to the amplitude.

With such a configuration, the information processing system 1 according to the present embodiment makes it possible to intuitively convey the feeling of a person located indoors to a person located outdoors.

The information processing system 1 according to the present embodiment is described in detail as above. It is to be noted that the configuration of the above-described information processing system 1 is merely an example, and thus, the present embodiment is not limited thereto. Next, description is give of modification examples of the present embodiment with reference to FIGS. 4 and 5.

Modification Example

Figure 4:
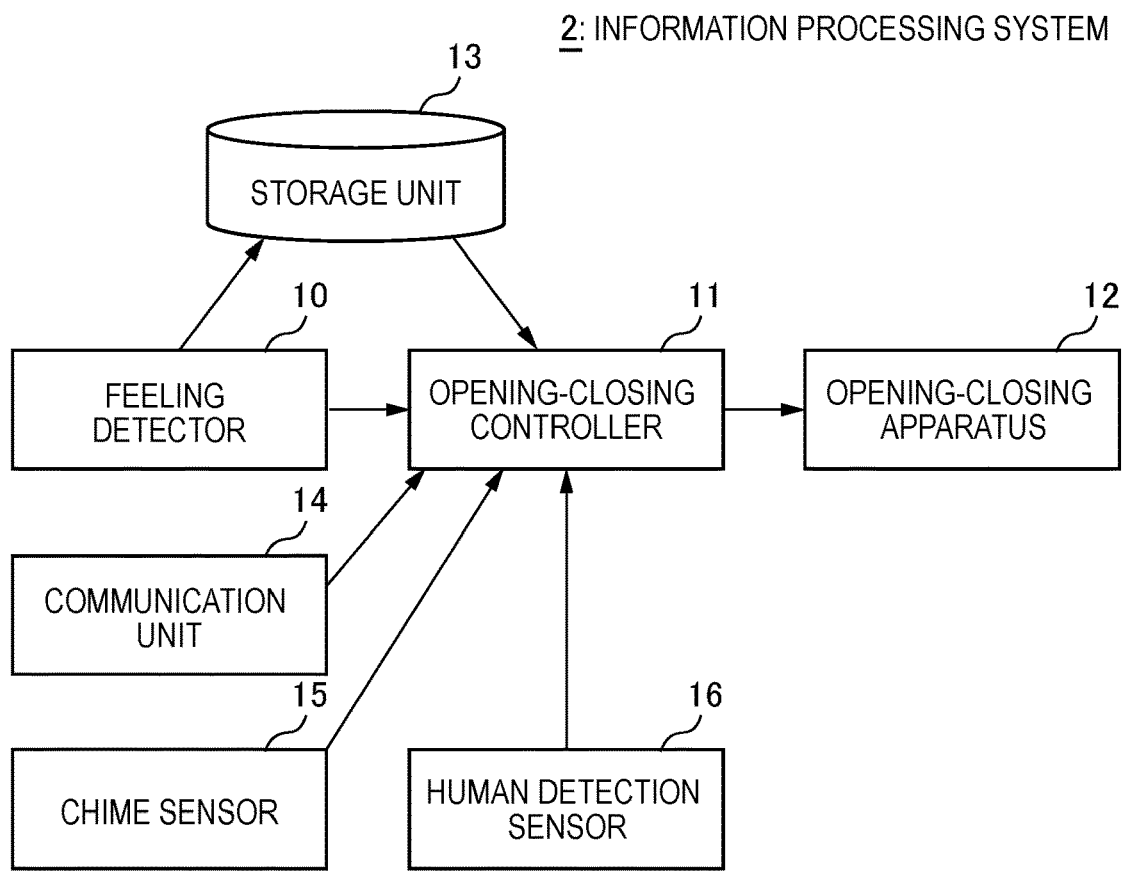
FIG. 4 is a block diagram illustrating a configuration example of an information processing system according to a modification example of the first embodiment.

FIG. 4 is a block diagram illustrating a configuration example of an information processing system 2 according to a modification example of the first embodiment. As illustrated in FIG. 4, the information processing system 2 includes the feeling detector 10, the opening-closing controller 11, the opening-closing apparatus 12, a storage unit 13, a communication unit 14, a chime sensor 15, and a human detection sensor 16.

The basic functions of the feeling detector 10, the opening-closing controller 11, and the opening-closing apparatus 12 are similar to a corresponding one of the respective configurations having the same reference numerals that have been described with reference to FIG. 2. The present modification example further has functions as described below.

The feeling detector 10 according to the present modification example continuously detects the user feeling, and stores the user feeling as a user feeling history in the storage unit 13.

Further, the opening-closing controller 11 controls the opening-closing resistance of the opening-closing apparatus 12 on the basis of, for example, information acquired through the communication unit 14, presence or absence of the chime sound based on the detection result of the chime sensor 15, and presence or absence of a person around a door based on the detection result of the human detection sensor 16, in addition to the user feeling history stored in the storage unit 13.

Regarding the information acquired through the communication unit 14, for example, communication contents (for example, an e-mail) between a user and another user or schedule information of a family are assumed. For example, in a case where a user has received from a member of the family an email saying that "I am going to go home 8 PM today", the opening-closing controller 11 refers to the user feeling history stored in the storage unit 13, and recognizes the user's current feeling about the member of the family. In a case where the user does not have good feeling about the member of the family, the opening-closing controller 11 controls the opening-closing resistance of the door to be heavier when a person is detected around the door around 8 PM. This makes it possible to achieve controlling the opening-closing resistance of the door in consideration of the user feeling which differs according to persons, in a case of, for example, fighting with a member of the family. In addition, in a case where an entrance chime rings, a general visitor (other than the family) is assumed. Therefore, it is possible for the opening-closing controller 11 to switch the opening-closing resistance to a normal state in order to avoid an occurrence of a problem in dealing with the visitor by the user.

Figure 5:
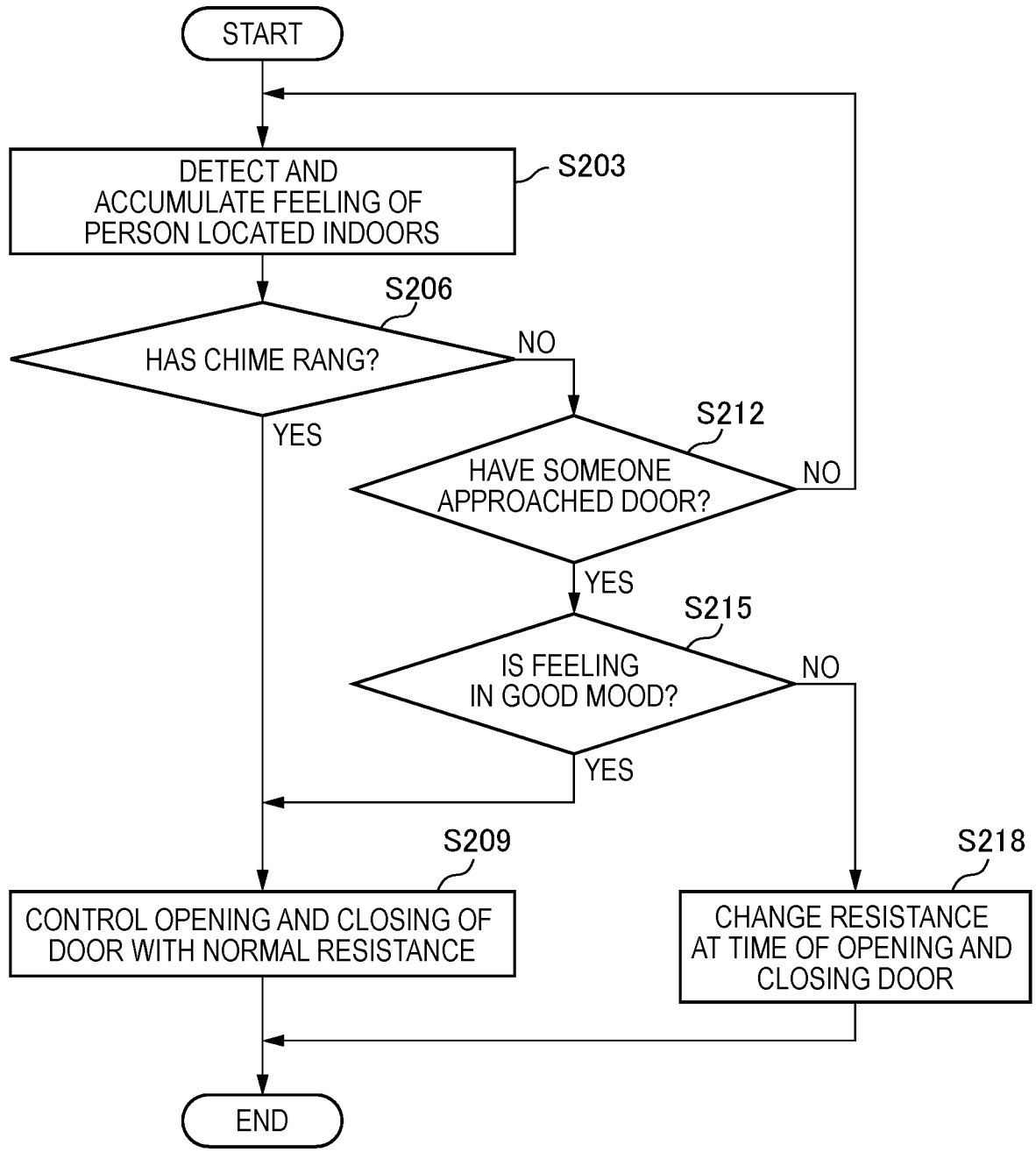
FIG. 5 is a flowchart illustrating operation processing according to the present modification example.

Next, description is given of the operation processing according to the present modification example with reference to FIG. 5. FIG. 5 is a flowchart illustrating the operation processing according to the present modification example.

First, as illustrated in FIG. 5, the feeling detector 10 of the information processing system 2 detects a feeling of a person located indoors, and accumulates a detection result as a user feeling history in the storage unit 13 (Step S203).

Next, the opening-closing controller 11 of the information processing system 2 determines whether the chime has rang on the basis of the detection result of the chime sensor 15 (Step S206).

Next, in a case where the entrance chime has rang (Step S209/Yes), the opening-closing controller 11 performs opening-closing control of a door (an example of the opening-closing apparatus 12) with a normal resistance.

On the other hand, in a case where the entrance chime has not rang (Step S209/No) and someone having approached the door has been detected by the human detection sensor 16 (Step S212/Yes), the opening-closing controller 11 acquires the user feeling history from the storage unit 13, and determines whether the user feeling is in a good mood (Step S215).

Next, in a case where the user feeling is in a good mood (Step S215/Yes), the opening-closing controller 11 controls opening and closing the door with a normal resistance (Step S209).

On the other hand, in a case where the user feeling is not in a good mood (Step S215/No), the opening-closing controller 11 changes the resistance at the time of opening and closing the door (Step S218). For example, the opening-closing controller 11 quantifies the degree of the user's bad mood or the feeling of rejecting the entrance from the outside, and thereby controls to cause the opening-closing resistance to be heavier according to the amplitude.

In addition, while the chime has not rang (Step S206/No) and no one has approached the door (Step S212/No), the detection of the feeling of a person located indoors and the accumulation, as described in the above-described Step S203, may be continuously performed.

2-2. Second Embodiment

Next, description is given, as a second embodiment, of operation processing in not the case of the door for which the opening-closing apparatus 12 is described with the operation processing according to the first embodiment, but a case of a mail receiving apparatus (mailbox) 12P. The mailbox includes a receiving opening that receives mails, and it is also possible to control the degree of opening and closing (open, close), in addition to the opening-closing resistance of such a receiving opening according to the user feeling. Further, it is possible to use the mailbox as a communication tool according to a resident feeling by showing a sign of a smile or rejection on the mailbox in association with the control of the receiving opening.

The configuration of the information processing system according to the second embodiment is similar to the configuration of the information processing system 1 described with reference to FIG. 2. The mailbox 12P is used as an example of the opening-closing apparatus 12.

Figure 6:
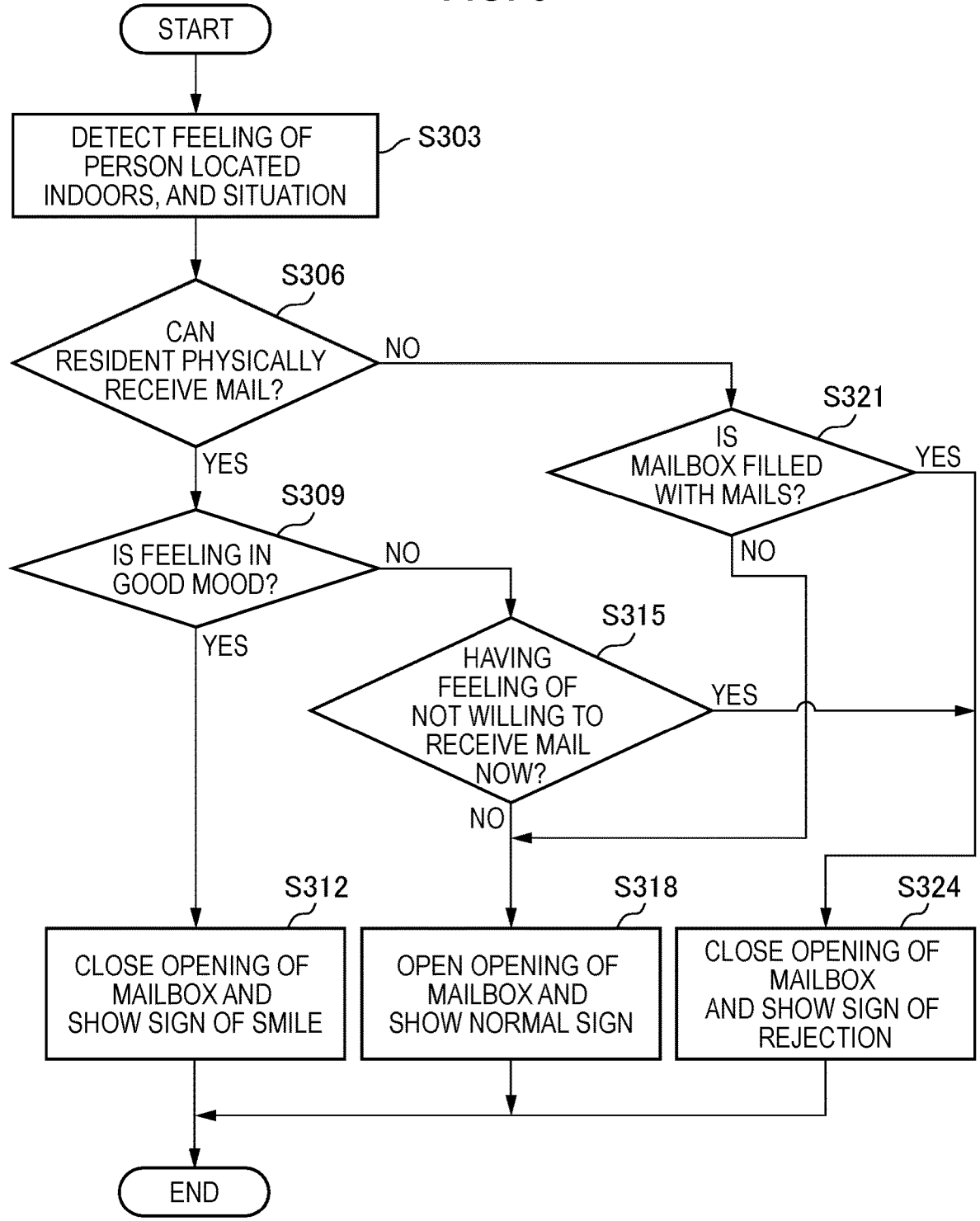
FIG. 6 is a flowchart illustrating operation processing of an information processing system according to a second embodiment.

FIG. 6 is a flowchart illustrating operation processing of an information processing system according to the second embodiment. First, as illustrated in FIG. 6, the feeling detector 10 detects a feeling of a person located indoors, and a situation (Step S303). The detection of situation is, for example, recognition of a user's action based on a captured image. In the present embodiment, the detection of the situation may be performed together by the feeling detector 10.

Next, the opening-closing controller 11 determines whether a resident (user) can physically receive a mail or a home delivery object on the basis of a user situation detected by the feeling detector 10 (Step S306). In a case where the user is not available or concentrating on watching television, it is determined that the user cannot receive the mail or the home delivery object physically.

Next, in a case where it is determined that the user can receive the mail or the home delivery object physically (Step S306/Yes), the opening-closing controller 11 determines whether the user feeling is in a good mood (Step S309). In other words, the opening-closing controller 11 determines whether the user can have a smile and receive the mail face-to-face.

Thereafter, in a case where it is determined that the user feeling is in a good mood (Step S309/Yes), the opening-closing controller 11 controls to close the mail receiving opening of the mailbox 12P and show a sign of a smile (Step S312). Here, FIG. 7 illustrates an example of showing a sign by the mailbox 12P of the present embodiment. As illustrated in FIG. 7, eyes (screen display or a physical structure) and a mouth (an openable-closable mail receiving opening) are provided to the mailbox 12P, for example, for enabling communication. Regarding the sign of a smile, the sign of a smile indicating that the user has a smile and receives a mail face-to-face is shown by closing the receiving opening and performing screen display of a smile made by making the corners of the mouth upwards, as in the mailbox 12P-1, for example.

On the other hand, in a case where the user feeling is not in a good mood (Step S309/No), the opening-closing controller 11 determines whether the user further has a feeling of not willing to receive a mail now (Step S315).

Next, in a case where the user does not have a feeling of not willing to receive a mail (Step S315/No), the opening-closing controller 11 opens the receiving opening of the mailbox 12P and shows a normal sign (Step S318). For example, as illustrated in the mailbox 12P-2 of FIG. 7, the opening-closing controller 11 controls to open the receiving opening so as to be seen as a regular face, thereby allowing for receiving mails as usual. In addition, in a case where a resident cannot receive a mail physically (Step S306/No) and the mailbox is not filled with mails (Step S321/No), the opening-closing controller 11 opens the receiving opening of the mailbox 12P and shows a normal sign, thereby allowing for receiving mails as usual (Step S318).

On the other hand, in a case where the user has a feeling of not willing to receive a mail (Step S315/Yes), the opening-closing controller 11 closes the receiving opening of the mailbox 12P and shows a sign of rejection (Step S324). For example, as illustrated in the mailbox 12P-3 of FIG. 7, the opening-closing controller 11 closes the receiving opening, and shows the sign of rejection by displaying a straight mouth that is made by not making the corners of the mouth upwards (or making them downwards) and performing screen display indicating rejection with the eyes as well, thereby showing that the user is not willing to receive a mail. In addition, in a case where the resident cannot receive a mail physically (Step S306/No), and a mailbox is filled with mails (Step S321/Yes), the opening-closing controller 11 similarly closes the receiving opening of the mailbox 12P, and shows the sign of rejection, thereby showing that the user cannot receive a mail (Step S318).

It is to be noted that, while showing the sign of rejection, the opening-closing controller 11 increases and decreases the "opening-closing resistance" of the mail receiving opening of the mailbox 12P-3 according to the degree of rejection based on the user feeling. With such a configuration, in a case of "an item that must be delivered", it is assumed that a delivery person opens, by force, the mail receiving opening of the mailbox 12P-3 which has been closed. On the other hand, in a case of a leaflet and the like that has been posted casually, there is a merit to avoid such a leaflet and the like to be posted, etc.

Further, the resident feeling or the state is reflected on the mailbox 12P. Therefore, for example, neighbors or the like passing by the house notice the resident feeling in a casual manner, which allows the configuration to be used as a communication tool. This leads to a merit to utilize communication activation in a local community.

In addition, by further combining with person specification through a monitoring camera, it is possible to achieve not only the resident feeling, but also further delicate dealing in a "thoughtful" communication in which, for example, in a case of "a welcome person (for example, a family or an acquaintance)", a sign of a smile is shown on the mailbox 12P for welcoming, and in a case of "an uninvited guest (for example, walk-in sales)", a sign of rejection is shown in the mailbox 12P to show the feeling.

3. CONCLUSION

As described above, in the information processing system according to the embodiments of the disclosure, it is possible to intuitively convey a feeling of a person located indoors to a person located outside.

Specifically, it is possible to convey a user feeling, without speaking, to a person who should be notified without using any language, by quantifying the user feeling that is detected by the feeling detector 10 and controlling to increase and decrease the opening-closing resistance of a door, etc.

Furthermore, according to the present embodiment, in contrast to the cultures in which expressed communications by way of language are dominant in, for example, Western countries, it is possible to promote "communication activation" in regions in, for example, Asia, in which the population densities are high and cultures having thoughtful communications sensitive to other people feelings are important.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

For example, it is also possible to create a computer program that executes the functions of the above-described information processing system 1, in hardware such as a CPU, ROM, and RAM that is built in the information processing system 1. Further, a computer-readable storage medium that has the computer program stored therein is also provided.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)

An information processing apparatus including:

an acquisition unit that acquires a feeling of a user located indoors; and a control unit that controls an opening-closing resistance of an openable and closable instrument, according to the feeling of the user.

(2)

The information processing apparatus according to (1), in which the instrument is an openable and closable fixture installed at a boundary with an outside, or a mail receiving apparatus having an openable and closable mail receiving opening.

(3)

The information processing apparatus according to (1) or (2), in which the control unit controls the opening-closing resistance to be heavier in a case where the feeling of the user is not in a good mood than in a case where the feeling of the user is in a good mood.

(4)

The information processing apparatus according to any one of (1) to (3), in which the control unit controls opening and closing of the instrument with a normal resistance in a case where the feeling of the user is in a good mood.

(5)

The information processing apparatus according to any one of (1) to (4), in which the openable and closable instrument is an entrance door, and in a case where an entrance chime has rang, the control unit controls opening and closing of the entrance door with a normal resistance.

(6)

The information processing apparatus according to any one of (1) to (5), in which the openable and closable instrument is an entrance door, and in a case where an entrance chime has not rang, the control unit controls the opening-closing resistance of the entrance door according to the feeling of the user.

(7)

The information processing apparatus according to (1), in which the openable and closable instrument is a mail receiving apparatus having a openable and closable mail receiving opening, and in a case where the feeling of the user is in a good mood, the control unit closes the mail receiving opening of the mail receiving apparatus, and shows a sign of a smile.

(8)

The information processing apparatus according to (1), in which the openable and closable instrument is a mail receiving apparatus having a openable and closable mail receiving opening, and in a case where the feeling of the user is not in a good mood, the control unit closes the mail receiving opening of the mail receiving apparatus, and shows a sign of rejection.

(9)

The information processing apparatus according to (1), in which the openable and closable instrument is a mail receiving apparatus having a openable and closable mail receiving opening, and in a case where the feeling of the user is not in a good mood but has yet to reach a feeling of rejection of receiving a mail, the control unit opens the mail receiving opening of the mail receiving apparatus and shows a normal sign.

(10)

The information processing apparatus according to any one of (1) to (9), in which the acquisition unit detects the feeling of the user on a basis of a facial image, sound information, or bio-information of the user.

(11)

An information processing method performed by a processor, the method including:

acquiring a feeling of a user located indoors; and controlling an opening-closing resistance of an openable and closable instrument according to the feeling of the user.

(12)

A program that causes a computer to function as:

an acquisition unit that acquires a feeling of a user located indoors; and a control unit that controls an opening-closing resistance of an openable and closable instrument according to the feeling of the user.

REFERENCE SIGNS LIST 1, 2 information processing system
10 feeling detector
11 opening-closing controller
12 opening-closing apparatus
12P-1, 12P-2, 12P-3 mailbox
13 storage unit
14 communication unit
15 chime sensor
16 human detection sensor

The invention claimed is:

1. An information processing apparatus comprising:
processing circuitry configured to
acquire a feeling of a user located indoors; and
control a resistance to movement of an openable and closable instrument, such that difficulty of opening or closing the instrument by another person is changed according to the feeling of the user.

2. The information processing apparatus according to claim 1, wherein the instrument is an openable and closable fixture installed at a boundary with an outside, or a mail receiving apparatus having an openable and closable mail receiving opening.

3. The information processing apparatus according to claim 1, wherein the processing circuitry controls the resistance to movement to be heavier in a case where the feeling of the user is not in a good mood than in a case where the feeling of the user is in a good mood.

4. The information processing apparatus according to claim 1, wherein the processing circuitry controls the resistance to movement of the instrument to be a nonnal resistance in a case where the feeling of the user is in a good mood.

5. The information processing apparatus according to claim 1, wherein
the openable and closable instrument is an entrance door, and
in a case where an entrance chime has been rune, the processing circuitry controls the resistance to movement of the entrance door to be a normal resistance.

6. The information processing apparatus according to claim 1, wherein
the openable and closable instrument is an entrance door, and
in a case where an entrance chime has not been rune, the processing circuitry controls the resistance to movement of the entrance door according to the feeling of the user.

7. The information processing apparatus according to claim 1, wherein
the openable and closable instrument is a mail receiving apparatus having an openable and closable mail receiving opening, and
in a case where the feeling of the user is in a good mood, the processing circuitry closes the mail receiving opening of the mail receiving apparatus, and shows a sign of a smile.

8. The information processing apparatus according to claim 1, wherein
the openable and closable instrument is a mail receiving apparatus having an openable and closable mail receiving opening, and
in a case where the feeling of the user is not in a good mood, the processing circuitry closes the mail receiving opening of the mail receiving apparatus, and shows a sign of rejection.

9. The information processing apparatus according to claim 1, wherein
the openable and closable instrument is a mail receiving apparatus having an openable and closable mail receiving opening, and
in a case where the feeling of the user is not in a good mood but has yet to reach a feeling of rejection of receiving a mail, the processing circuitry opens the mail receiving opening of the mail receiving apparatus and shows a normal sign.

10. The information processing apparatus according to claim 1, wherein the processing circuitry detects the feeling of the user on a basis of a facial image, sound information, or bio-information of the user.

11. The information processing apparatus according to claim 1, wherein the another person is located in an area that is separated from the user by the instrument.

12. An information processing method performed by a processor, the method comprising:
acquiring a feeling of a user located indoors; and controlling a resistance to movement of an openable and closable instrument, such that difficulty of opening or closing the instrument by another person is changed according to the feeling of the user.

13. The information processing method according to claim 12, wherein the another person is located in an area that is separated from the user by the instrument.

14. A non-transitory computer-readable storage medium storing computer-readable instructions thereon, that, when executed by a computer, cause the computer to perform a method comprising:
   acquiring a feeling of a user located indoors; and
   controlling a resistance to movement of an openable and closable instrument, such that difficulty of opening or closing the instrument by another person is changed according to the feeling of the user.

15. The non-transitory computer-readable storage medium according to claim 14, wherein the another person is located in an area that is separated from the user by the instrument.

* * * * *